Patented Oct. 14, 1941

2,259,164

UNITED STATES PATENT OFFICE 2,259,164

METHOD OF REACTING SULPHUR MONO-CHLORIDE AND AMINES

Paul C. Jones, Akron, Ohio, assignor to The B. F. Goodrich Company, New York, N. Y., a corporation of New York No Drawing. Application June 30, 1939,
Serial No. 282,149

5 Claims. (Cl. 260—583)

This invention relates to a new method of reacting sulphur monochloride and primary or secondary aliphatic amines.

It has previously been proposed to react sulphur monochloride and primary or secondary aliphatic amines in an organic solvent (cf. Michaelis and Luxembourg, Berichte der deutschen chemischen Gesellschaft, vol. 28, page 165). This reaction is a batch process in which the amine hydrochloride is filtered from the organic solvent and left in a solid state at the end of the reaction.

It has also been proposed to produce N-thioamines by reacting sulphur monochloride with amines in a cooled aqueous medium (Birchall and Coffey, U. S. Patent No. 1,842,711). This reaction produces lower yields than the reaction carried out in an organic solvent, and the product invariably contains free sulphur which is only removed with great difficulty. It is sometimes impossible to remove the water from the products by heat, since many of the N-thioamines are rather unstable at elevated temperatures.

It is an object of this invention to provide a method for the reaction of sulphur monochloride and primary or secondary aliphatic amines which may be performed continuously if desired. It is another object of the invention to provide a method which produces substantially quantitative yields of pure products. It is a further object of this invention to provide a method wherein the speed of addition of the sulphur monochloride and the temperature at which the reaction is carried out are not critical, but are susceptible of wide variation.

The method of this invention comprises the addition of sulphur monochloride to a solution of the amine in an anhydrous organic solvent which is substantially immiscible with water and inert to amines and sulphur monochloride. After the sulphur monochloride has been added, water is added to dissolve the amine hydrochloride. The two liquid phases are separated, and the N-thioamine is recovered from the organic phase. Excess alkali is added to the water phase to release the amine which is then extracted with the same solvent used in the first step. The amine solution is rendered anhydrous, more sulphur chloride is added, and the process is repeated.

A wide range of organic solvents are immiscible with water and inert to amines and sulphur monochloride. Suitable types of compounds include the aromatic, aliphatic, and cycloaliphatic liquid hydrocarbons such as benzene, toluene, xylene, solvent naphtha, gasoline, hexane, and cyclohexane, and dialkyl and cyclic ethers such as diethyl ether. The solvent should be substantially anhydrous, since the presence of appreciable amounts of water in the solvent cause the formation of sulphur by reaction of the water with the sulphur chloride unless the reaction is carried on at a low temperature which is troublesome, expensive, and time-consuming.

Cycloaliphatic amines such as cyclohexyl amine and cyclohexyl ethyl amine, and saturated heterocyclic amines such as morpholine and piperidine are the equivalents of the alkyl and dialkyl amines such as dimethyl amine, diethyl amine, butyl amine, and di-n-butyl amine in the reaction with sulphur monochloride, and are accordingly within the scope of this invention.

In a specific embodiment of this invention, 516.6 gms. (4 mols.) of di-n-butylamine were dissolved in 2000 c. c. of benzene and placed in a flask provided with a mechanical stirrer and a reflux condenser. A solution of 135 gms. (1 mol.) of sulphur monochloride in 1000 c. c. of benzene was added dropwise over a period of 10 minutes, the temperature in the flask rising from 22° C. to 70° C. The amine hydrochloride precipitate which formed was dissolved by adding 500 c. c. of warm water, and the two liquid phases were separated. The benzene was distilled from the thioamine leaving a 100% yield of N,N'-dithio di-n-butylamine. The aqueous phase was treated with 696 grams of sodium hydroxide (a 300% excess) and extracted with benzene. The pale yellow benzene extract was distilled until the water was removed and anhydrous benzene was distilling off. This anhydrous benzene solution of di-n-butyl amine was then ready to be employed in the first step of the reaction.

The reaction may be repeated again and again with remarkably small losses of materials. Thus when the previous experiment was repeated using diamyl amine, 100% of N,N'-dithiodiamylamine was formed and 98% of the excess amine and 97% of the benzene used as the solvent were recovered. When sulphur monochloride was added to the recovered benzene solution of diamyl amine for a second preparation of dithioamine, a 95% yield of N,N'-dithiodiamylamine was obtained and 97% of the excess amine was recovered.

It will be noted that in the practice of the above method, no difficulties were experienced in drying any of the products. Any water in the benzene solution of thioamine product distills off with the benzene, and the benzene solution of amine, which is extracted from the alkali-treated aqueous solution of amine hydrochloride, is freed from water by merely distilling for a short time until the distillate consists of anhydrous benzene.

The method of this invention is equally well adapted to the preparation of a solid thioamine. To a solution of 69.6 gms. (.8 mol.) of morpholine in 250 c. c. of benzene were slowly added 27 gms. (.2 mol.) of sulphur monochloride dissolved in 50 c. c. of benzene. The slurry which formed was continually stirred, and the temperature rose almost to the boiling point of the benzene. When 75 c. c. of warm water were added with shaking, the precipitate dissolved and two liquid phases were formed. The benzene phase was separated, the benzene was distilled off, and 44 gms. (93% of theory) of pale yellow crystalline N,N'-dithiomorpholine were obtained. The water solution of amine hydrochloride could be reused as before.

Although I have herein disclosed specific embodiments of my invention, I do not desire to limit myself solely thereto, for it will be obvious to those skilled in the art that many variations and modifications are within the spirit and scope of the invention as defined in the appended claims.

I claim:

1. In the method of preparing N-thioamines by reacting sulphur monochloride with a member of the class consisting of primary and secondary aliphatic, cycloaliphatic, and saturated heterocyclic amines in an anhydrous organic solvent immiscible with water and inert toward the sulphur monochloride and amine; the steps of adding sufficient water to the reaction mixture to dissolve the amine hydrochloride, separating the two liquid phases, and recovering the product from the organic solvent phase.

2. In the method of preparing N-thioamines by reacting sulphur monochloride with a member of the class consisting of primary and secondary aliphatic, cycloaliphatic, and saturated heterocyclic amines in an anhydrous organic solvent immiscible with water and inert toward the sulphur monochloride and amine; the steps of adding sufficient water to the reaction mixture to dissolve the amine hydrochloride, separating the two liquid phases, recovering the product from the organic solvent phase, adding sufficient alkali to the water phase to free the amine, extracting the amine from the water phase with the organic solvent, rendering the solution of the amine in the organic solvent anhydrous, and repeating the process by again reacting the anhydrous solution with sulphur monochloride.

3. In the method of preparing N-thioamines by reacting sulphur monochloride with an amine having at least one free hydrogen on the amino nitrogen the remaining valences of the nitrogen being occupied exclusively by substituents of the nature of saturated hydrocarbon groups, in an anhydrous organic solvent immiscible with water and inert towards the sulphur monochloride and amine; the steps of adding sufficient water to the reaction mixture to dissolve the amine hydrochloride, separating the two liquid phases, recovering the product from the organic solvent phase, adding sufficient alkali to the water phase to free the amine, extracting the amine from the water phase with the organic solvent, rendering the solution of the amine in the organic solvent anhydrous, and repeating the process by again reacting the anhydrous solution with sulphur monochloride.

4. In the method of preparing N-thioamines by reacting sulphur monochloride with an amine having a single free hydrogen on the amino nitrogen the other two valences of the nitrogen being occupied exclusively by substituents of the nature of saturated hydrocarbon groups, in an anhydrous organic solvent immiscible with water and inert towards the sulphur monochloride and amine; the steps of adding sufficient water to the reaction mixture to dissolve the amine hydrochloride, separating the two liquid phases, recovering the product from the organic solvent phase, adding sufficient alkali to the water phase to free the amine, extracting the amine from the water phase with the organic solvent, rendering the solution of the amine in the organic solvent anhydrous, and repeating the process by again reacting the anhydrous solution with sulphur monochloride.

5. The method of claim 4 in which the amine is a dialkyl amine and the solvent is benzene.

PAUL C. JONES.